Sept. 30, 1958     G. B. HEDDENDORF ET AL     2,853,939
RECORDING UNDER THE CONTROL OF SELECTIVELY DECODED DATA
Filed July 3, 1953                          12 Sheets-Sheet 1

Fig. 1
(PRIOR ART)

| UNITED EDISON CO. | | | | | | | |
|---|---|---|---|---|---|---|---|
| SERVICE TO MO. DAY YR. | | | BILL PERIOD TENTHS | METER READINGS | | ELEC.KWHR GAS C.CU.FT. | SERVICE RATE | AMOUNT |
| | | | | PREVIOUS | PRESENT | | | |
| MY | 10 | 53 | 10 | 1000 | 2000 | 1000 | E1 | 999.99 |
| MY | 10 | 53 | 10 | 1000 | 2000 | 1000 | NG1 | 999.99 |
| | | | | | | CRED | E2 | 7.56 |
| | | | | | | ARRS | NG1 | 12.18 |
| JAMES SMITH 159 MAPLE AVE WATERFALL NY | | | | | | | | $2019.72 PAY THIS AMOUNT |

Fig. 2

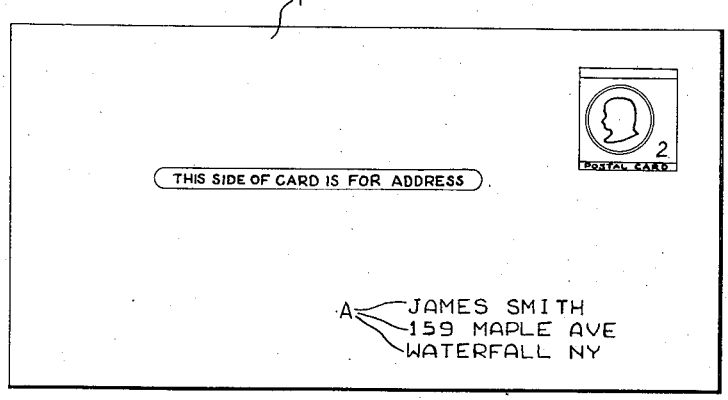

Fig. 3

INVENTORS.
GEORGE B. HEDDENDORF
EDMUND M. DiGIULIO
BY Charles P. Boberg
ATTORNEY Sept. 30, 1958   G. B. HEDDENDORF ET AL   2,853,939
RECORDING UNDER THE CONTROL OF SELECTIVELY DECODED DATA
Filed July 3, 1953                                12 Sheets-Sheet 4

INVENTORS.
GEORGE B. HEDDENDORF
EDMUND M. DiGIULIO
BY Charles P. Boberg
ATTORNEY

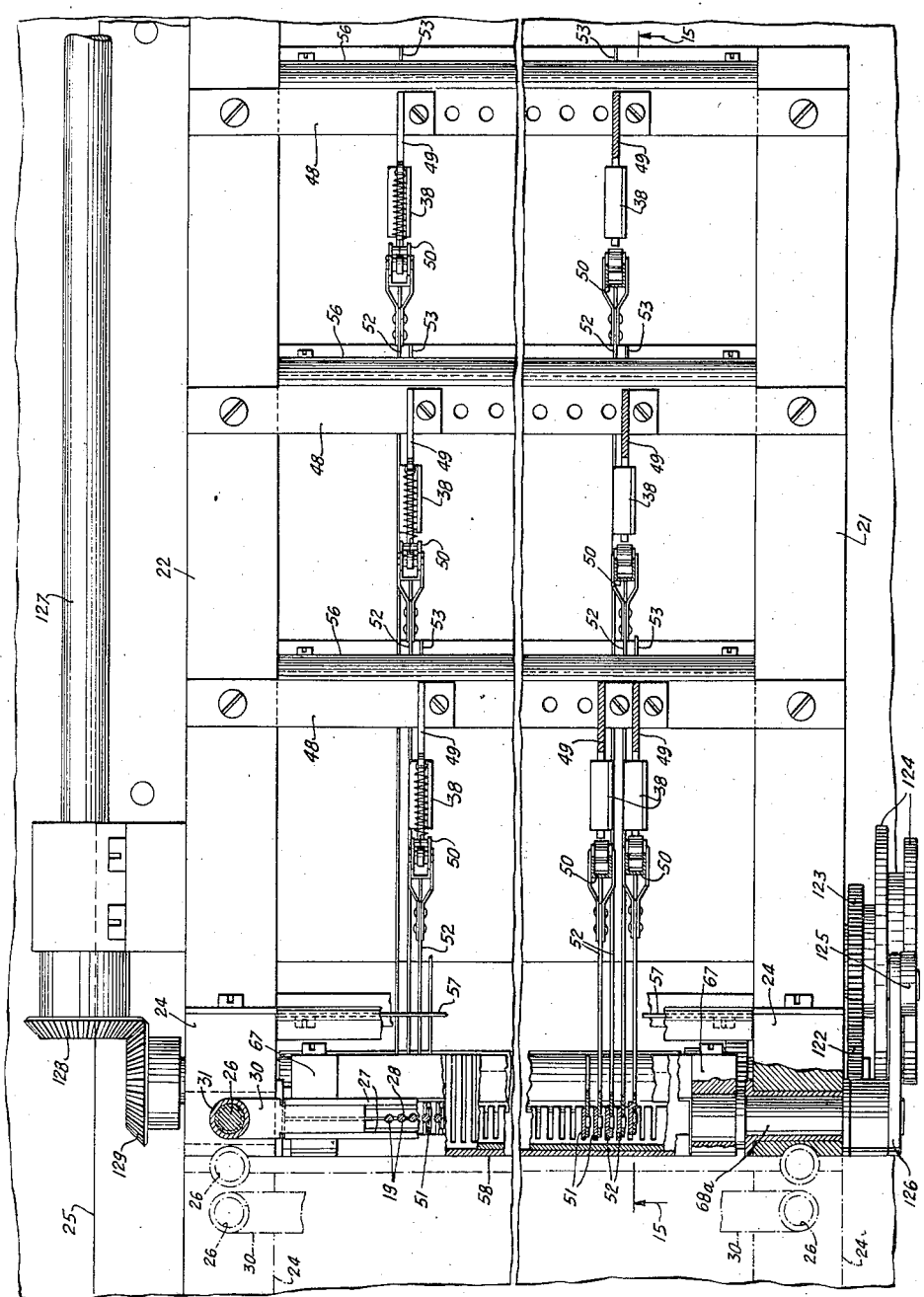

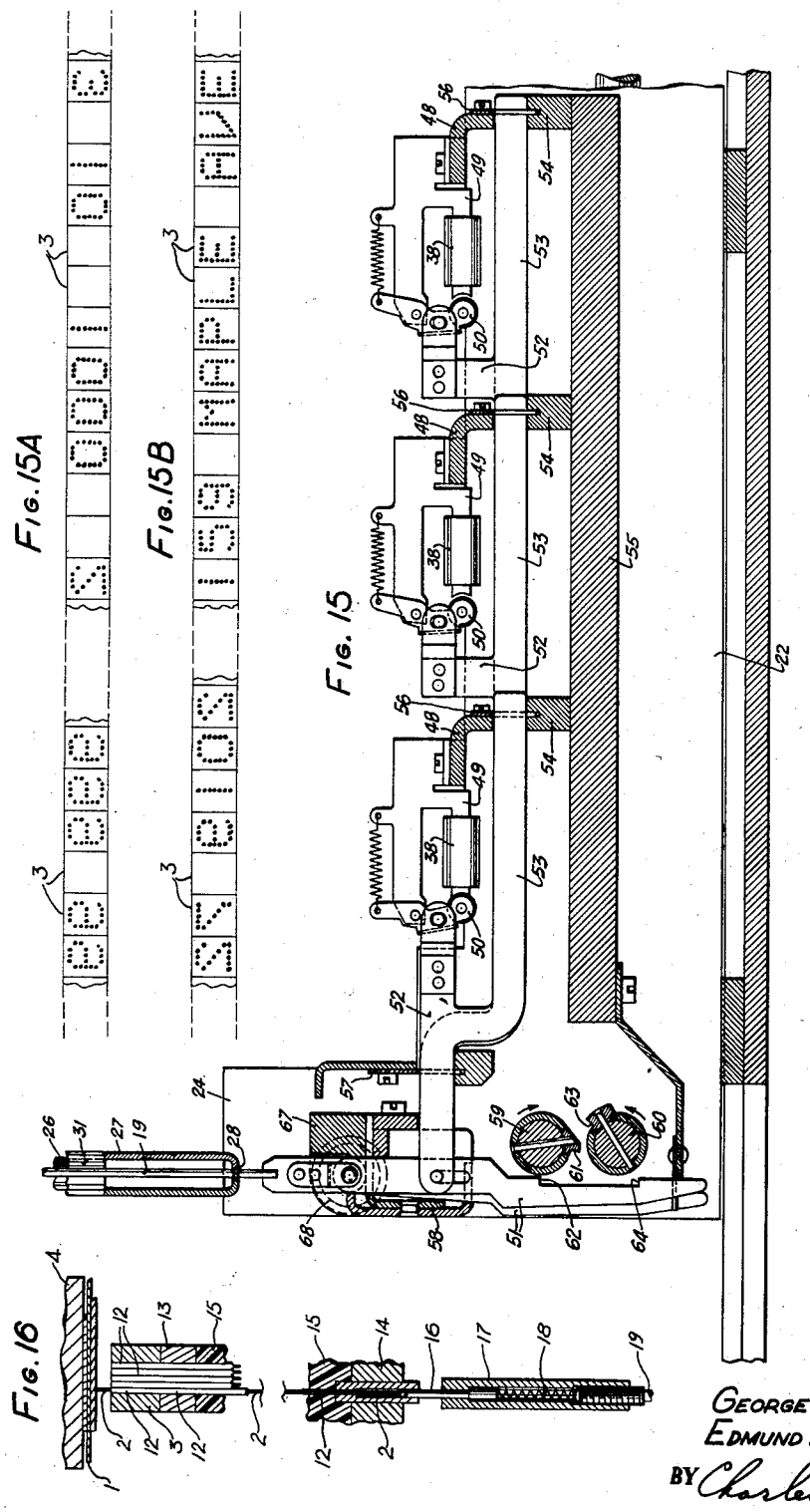

Sept. 30, 1958     G. B. HEDDENDORF ET AL     2,853,939
RECORDING UNDER THE CONTROL OF SELECTIVELY DECODED DATA
Filed July 3, 1953     12 Sheets-Sheet 7
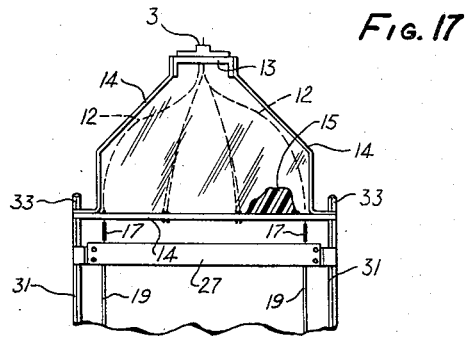
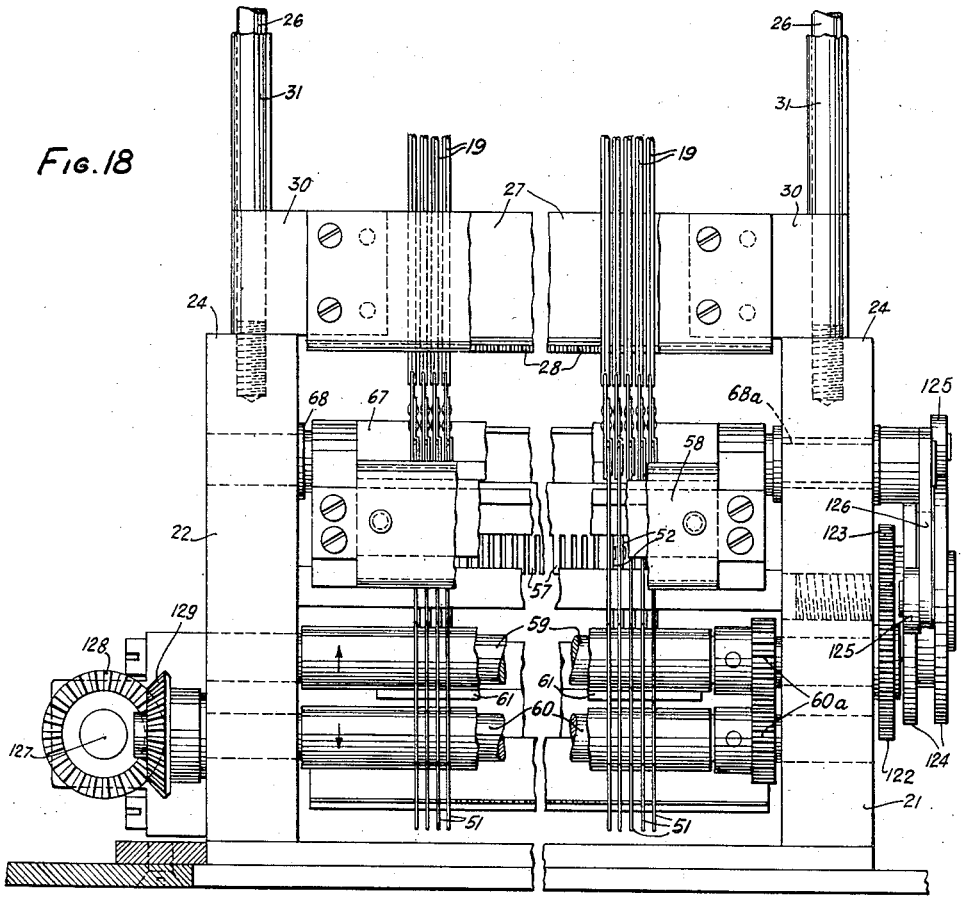
INVENTORS.
GEORGE B. HEDDENDORF
EDMUND M. DiGIULIO
BY Charles P. Boberg
ATTORNEY.

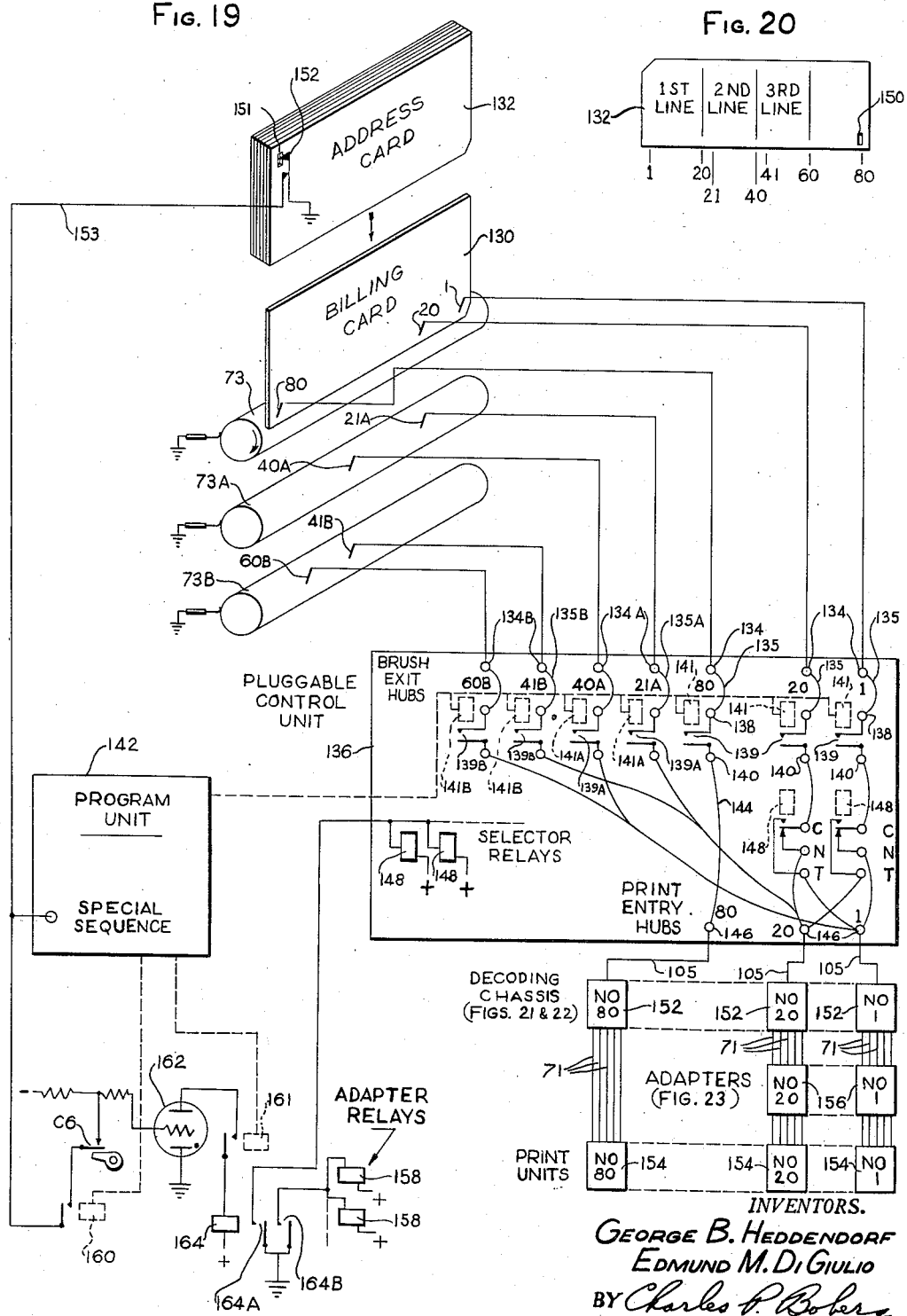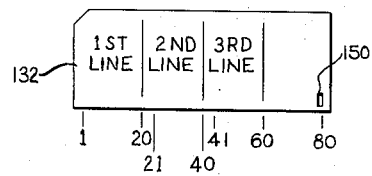

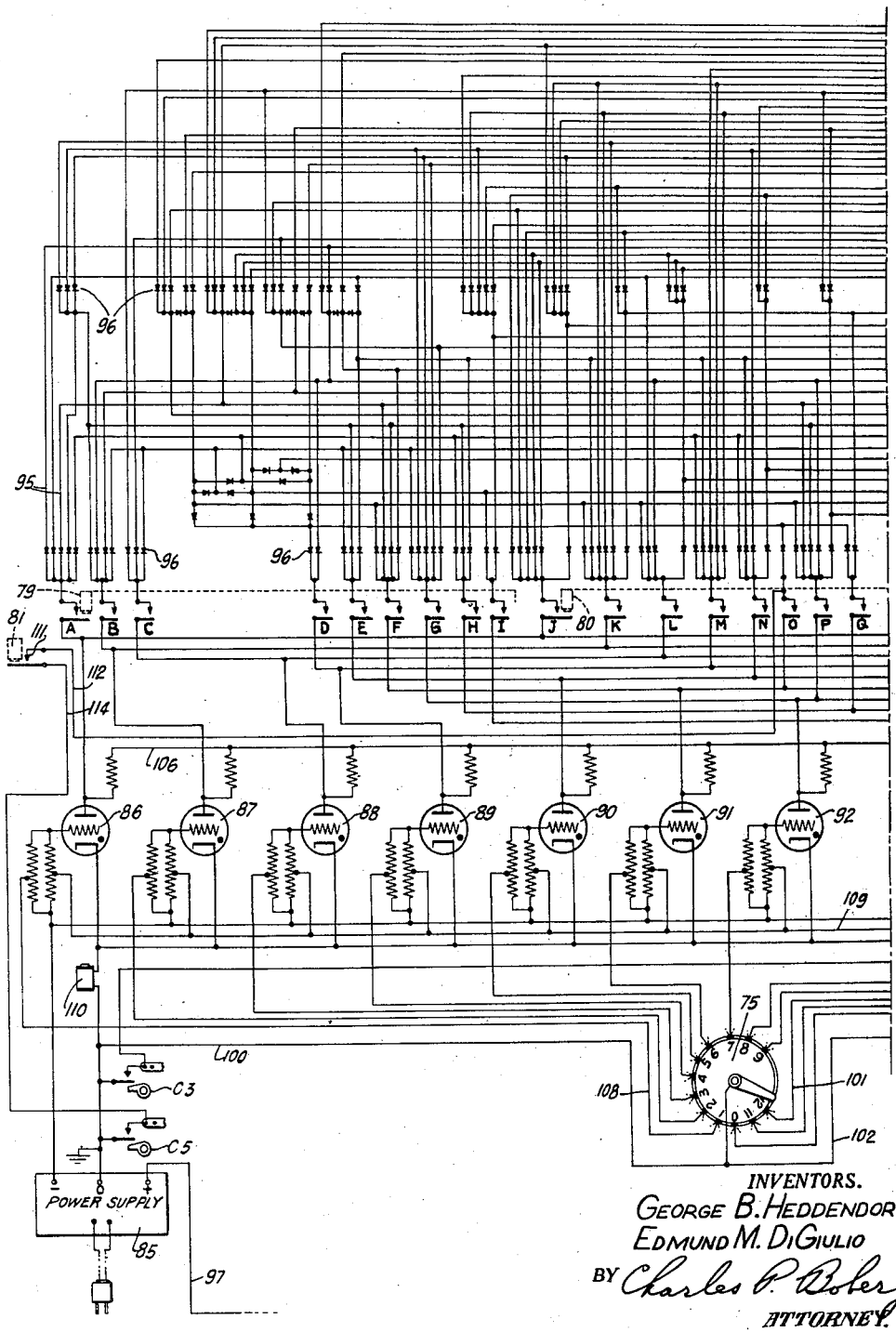

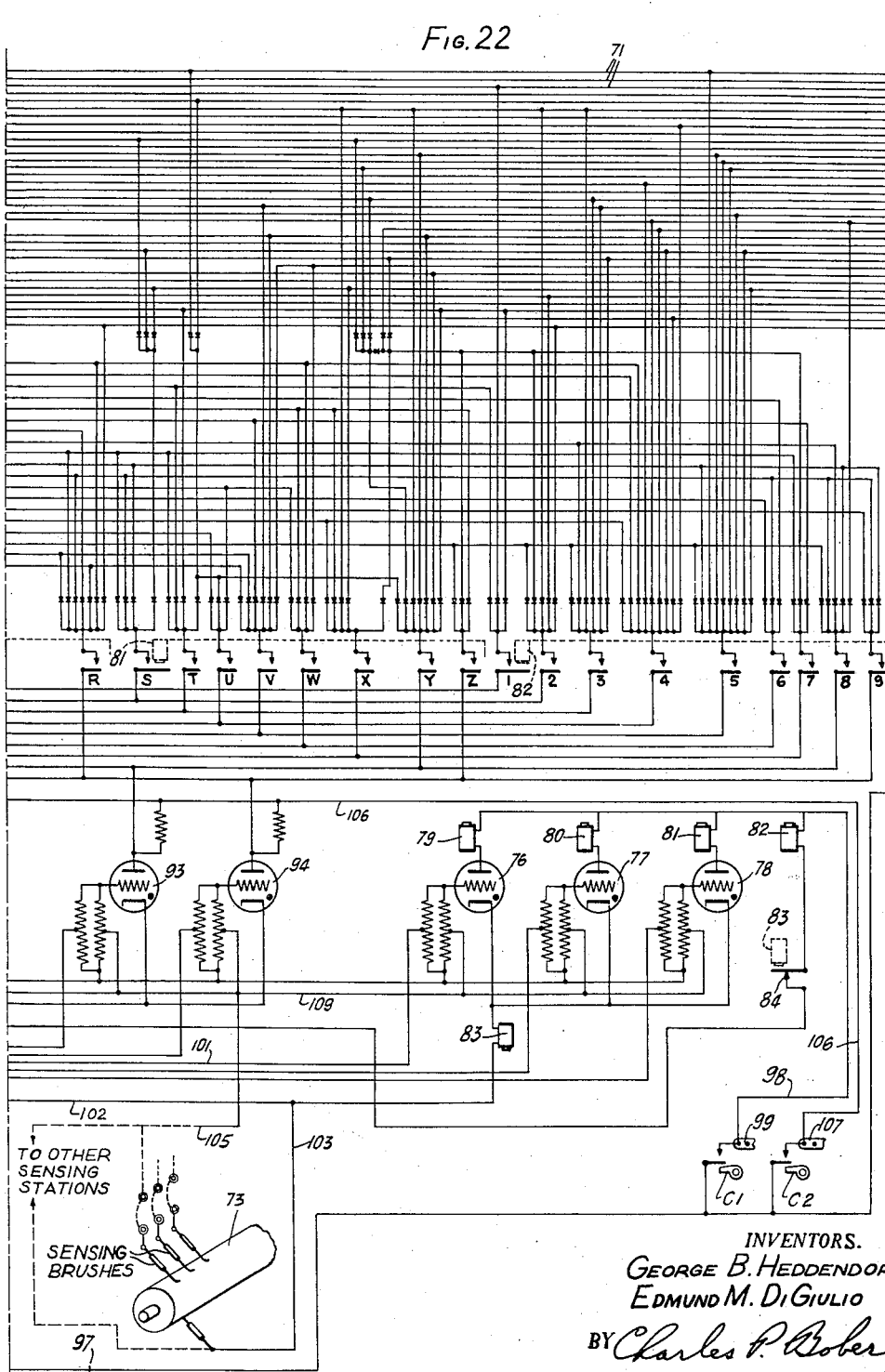

Sept. 30, 1958 G. B. HEDDENDORF ET AL 2,853,939
RECORDING UNDER THE CONTROL OF SELECTIVELY DECODED DATA
Filed July 3, 1953 12 Sheets-Sheet 11
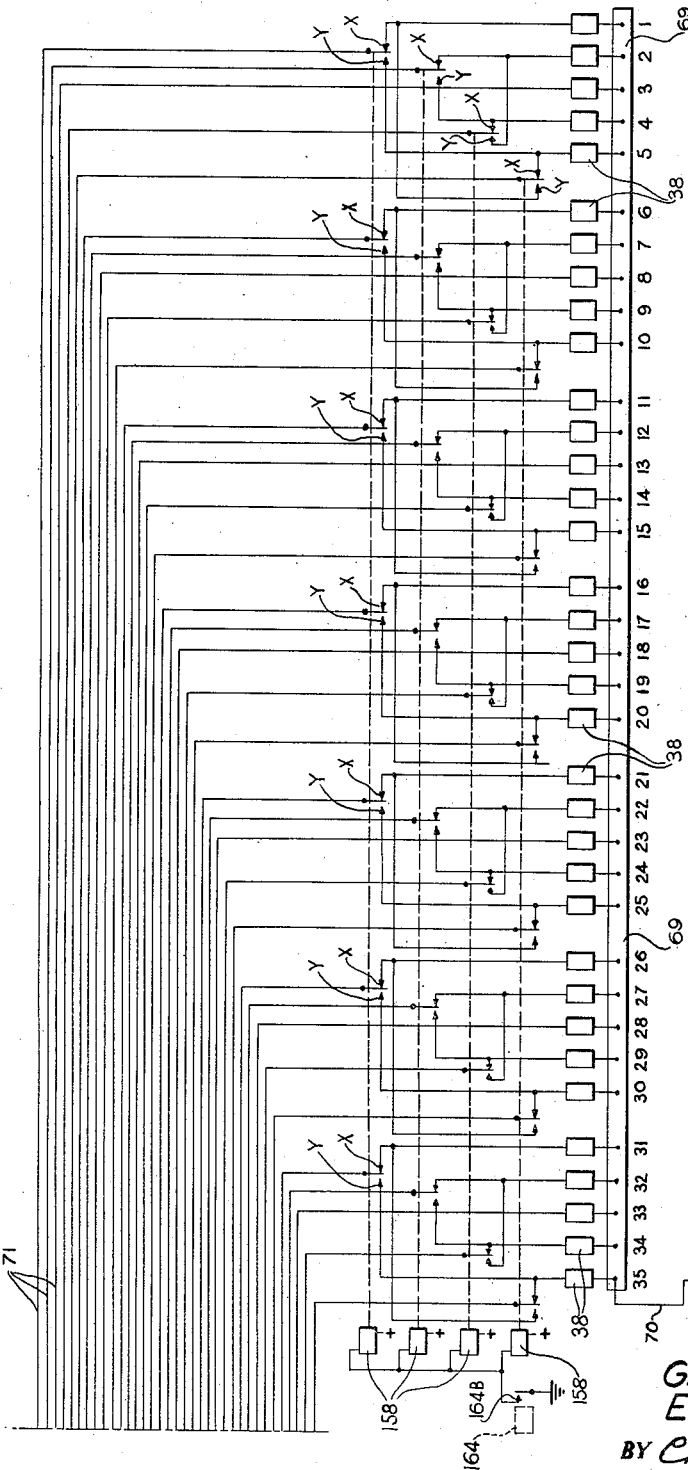
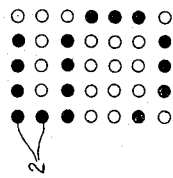
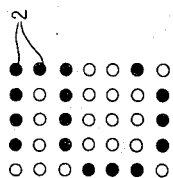
INVENTORS.
GEORGE B. HEDDENDORF
EDMUND M. DI GIULIO
BY Charles P. Boberg
ATTORNEY Sept. 30, 1958  G. B. HEDDENDORF ET AL  2,853,939
RECORDING UNDER THE CONTROL OF SELECTIVELY DECODED DATA
Filed July 3, 1953  12 Sheets-Sheet 12

INVENTORS.
GEORGE B. HEDDENDORF
EDMUND M. DIGIULIO
BY Charles P. Boberg
ATTORNEY United States Patent Office 2,853,939
Patented Sept. 30, 1958

2,853,939

RECORDING UNDER THE CONTROL OF SELECTIVELY DECODED DATA

George B. Heddendorf, Fayette, Maine, and Edmund M. Di Giulio, Brooklyn, N. Y., assignors to Burroughs Corporation, Detroit, Mich., a corporation of Michigan Application July 3, 1953, Serial No. 366,043

21 Claims. (Cl. 101—93)

This invention relates to recording machines and recording methods in which decoding schemes are employed to convert coded input data to ordinary output data.

The invention is concerned particularly with "selective" decoding, whereby each character of the input data can selectively produce (under different conditions) a variety of output characters. In one instance the several output characters that are respectively produced under different conditions may differ from each other only as to form, while in another instance the output characters may have different symbolic meanings as well. In either case, the selection of the output character which is to be recorded in response to a given input character is determined beforehand by so conditioning the system that a particular one of the available decoding schemes is rendered effective.

As to the first aspect of the invention, that is, the production of output characters that differ from each other in form but not in meaning, an example of this would be the setting up of type character formations which are the reverse of each other. Thus, in one situation it may be desired to make impressions with obverse type character formations and in another situation to make impressions with reverse formations of the same type characters, under the control of identical input data. A second aspect of the invention is concerned with making a selection among wholly different output characters or representations thereof in response to a given input character or representation thereof. In both of these aspects it may be said that the available decoding schemes function respectively to yield characters or representations thereof in a plurality of different character systems, under the control of like input data, and that the selection of the decoding scheme (and therefore the character system) which is to be effective depends upon the requirements that are being met.

The invention has particularly useful application to a class of recording machines herein designated as "convertible-type" printing machines. In machines of this class each type face is formed individually by selectively actuating the constituent members of an array or mosaic of similar printing elements, thereby producing a matrix or pattern of the character which is to be printed. Such machines commonly employ wire printing elements; hence they are referred to as "wire printers." Examples of wire printers are disclosed in United States Patent No. 2,632,-386 issued on March 24, 1953 to John J. Hyland (reissued as Re. 23,847 on July 7, 1954), and in the pending United States applications of William Wockenfuss and Herman Speh, Serial No. 80,136, filed March 8, 1949 (issued on July 13, 1954 as Patent No. 2,683,410), and of Frederick Q. Rast, Serial No. 118,063, filed September 27, 1949 (issued on June 22, 1954, as Patent No. 2,681,614). It should be understood, however, that the present invention is not limited to wire printers inasmuch as it can be applied as well to other forms of convertible-type printing machines known in the art, and in certain respects it is applicable to still other forms of selective recording devices, as will be pointed out hereinafter.

It has been customary to design convertible-type printing machines so that they will perform substantially the same functions as competitive printers which employ permanent type faces fixed on type bars or type wheels. Printers of the permanent-type variety are inherently limited in their choice of characters; that is to say, there is a practical limit to the number of type characters which can be accommodated on a bar or a wheel. This restricts the available selection of characters afforded by these machines. Thus, if the machine is operating in response to given control indicia (say, representations of alphabetical characters) it will automatically print the corresponding characters in a conventional fashion, but it cannot readily be conditioned so that in response to the same indicia it will print characters in a wholly different system, or print characters in an unconventional manner. This is due, as aforesaid, to the inherently limited capabilities of permanent-type selective printing machines, which cannot be exceeded without incurring much heavier manufacturing costs.

The nature of a convertible-type printing machine is such, however, that it has a much wider range of character selection. Where a permanent-type selective printing machine is practically limited to a range of less than fifty characters, a convertible-type machine has an almost unlimited choice of characters (including special symbols useful in various notations), so long as the character patterns can be defined within the available mosaic of printing elements. This is particularly true of those printing machines in which a mosaic of fine wires is employed to form the character patterns. Heretofore the art has failed to take full advantage of this extreme flexibility, preferring to keep within a more or less restricted mode of operation very much along the lines of the standard procedure mentioned above.

It is a broad object of this invention to utilize a convertible-type printing machine in a novel manner which overcomes the limitations of the prior art and greatly increases the usefulness of such machines.

A further object is to increase the range of character selection without increasing the number of printing elements needed therefor.

A still further object is to provide an improved record-controlled printing machine wherein type faces can be formed selectively in a plurality of character systems as determined by a key designation in a control record.

Still another object is to provide a novel high-speed printer which is adapted to form its type faces selectively in obverse and reverse relationships.

The last-mentioned object deserves special attention inasmuch as it is the basis for one of the most important features of the invention, that is, the ability to print selectively upon two sides of a single sheet using printing elements which are located on one side of the sheet only. There are many instances where it would be advantageous to print selectively upon both the front and the back of a sheet. In printing business instruments such as public utility bills or premium notices, for example, one may desire to print accounting data on the front of the sheet and address data on the back. This enables such instruments to be printed on postcards for direct mailing. Furthermore, it is desirable that at least some of the printing elements be adapted to print portions of the accounting data on certain lines of the bill and to print the address data on certain other lines of the bill. In still other instances it may be desired that certain portions of the same line be printed respectively upon the front and the back of the sheet. These conditions can be met by employing convertible-type printing elements which are operated selectively to form obverse type faces for printing characters upon the front of a sheet and reverse type faces for enabling characters to be printed upon the back of the sheet (through the medium of a back-printing carbon or the like).

A very important advantage of printing both the front and the back of the instrument at the same printing station and in the same operation is that the items of data on the two sides of the sheet are properly correlated, and the danger of mismatched data is eliminated. If the addresses were to be separately printed on the sheets in a separate addressing operation, there would always be a possibility of mismatching the addresses and the accounting data. Another advantage, of course, is the great saving of time which is effected by printing the addresses and the accounting data in the same run.

Another feature of the invention is the provision of an automatically positioned interposer mechanism to selectively permit or suppress printing on the reverse side of the sheet.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 1 is a view in elevation of a business instrument printed in standard form according to the prior art.

Figs. 2 and 3 are views in elevation respectively showing the front (or obverse) surface, and the back (or reverse) surface of a business instrument printed upon a postcard in accordance with the principles of the invention.

Fig. 14 is an enlarged fragmentary plan view, partly in section, of the mechanism for actuating the wires in a single printing head.

Fig. 15 is a vertical section on the line 15—15 of Fig. 14.

Figs. 15A and 15B are partially schematic plan views of the printing heads, as seen from the printing surface, indicating the manner in which the printing elements are actuated for printing typical lines of data upon the instrument shown in Figs. 2 and 3.

Fig. 16 is a fragmentary sectional view through a printing head assembly and its associated structure.

Fig. 17 is a fragmentary side elevation of a printing head assembly and its associated structure.

Fig. 18 is a side elevation looking from the left of Fig. 15.

Fig. 19 is a schematic illustration of a card-controlled printing machine which includes provisions for obverse and reverse printing in accordance with one embodiment of the invention.

Fig. 20 is a simplified representation of an address card for use in the machine which is shown in Fig. 19.

Figs. 21, 22 and 23 constitute a wiring diagram of the circuits associated with a single printing head for selectively forming type faces in obverse and reverse relationships, according to the embodiment of the invention shown in Fig. 19.

Fig. 24 is a chart indicating the arrangement and numbering of the wires in a single printing head, as viewed from the printing surface.

Figs. 25 and 26 are schematic showings of the manner in which the wires are actuated to form obverse and reverse type faces, respectively.

Figure 27:
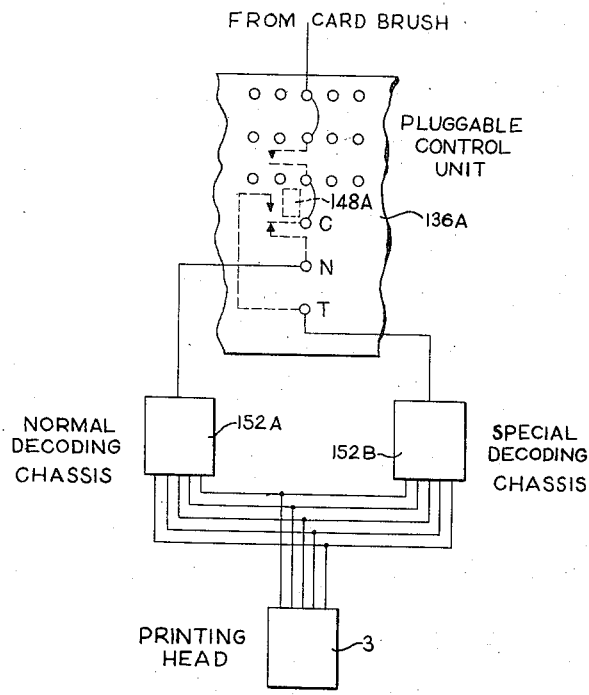

Fig. 27 is a partial schematic illustration of an alternative embodiment of the invention having provisions for selecting characters in two different systems.

Figure 28:
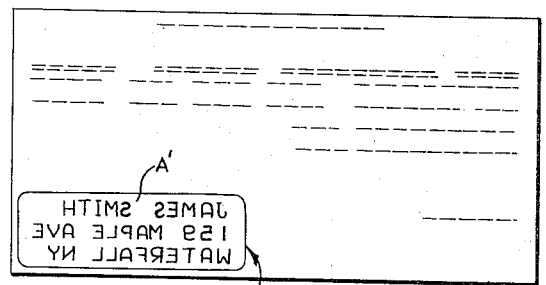

Fig. 28 is a simplified illustration of a business instrument having a section thereof printed with reversely positioned characters for transfer posting purposes.

The term "character," as employed herein, is intended to include not only numerical and alphabetical characters, but also any other symbols which the disclosed machine is capable of printing. The expressions "obverse" and "reverse" are mere relative terms and should not be construed too precisely as to their meanings, nor for the purpose of defining the scope of the invention. For example, a character may be reversed about a vertical axis as illustrated herein, or it may be reversed about a horizontal axis (that is, inverted), or be subjected to a combination of both actions depending upon the circumstances. The "front" of a sheet is defined herein as that surface of the sheet which is adjacent to the type or printing elements; while the "back" of the sheet is that surface which is remote from the type or printing elements, or adjacent to the platen. Where the term "inking medium" or "inking means" is employed, this refers to such materials as inked ribbons and carbon papers or any equivalent materials or devices. "Platen" includes any equivalent impression member, such as a printing hammer.

Fig. 1 illustrates, by way of example, a business instrument in the form of a public utility bill which has been printed in accordance with a well-known method of machine accounting. In this form of instrument the address A is printed on the same side of the sheet as the accounting or billing data B and B'. The various lines of billing data B generally are printed under the control of record cards. The amount of the bill (B') may be printed under the control of either an accumulator readout or a record card. The lines of the address A are printed under the control of one or more record cards.

It will be noted (Fig. 4) that certain columns of the instrument shown in Fig. 1 may contain, in different lines, printed characters of both the billing data B and the address data A. In other words, the type members associated with those particular columns are operated in some printing cycles to print portions of the billing data, and in other printing cycles they function to print the address data. Furthermore, it will be noted that the billing amount B' is aligned with one of the lines of the address A. These relationships will be referred to again in the subsequent description.

The instrument shown in Fig. 1 is not adapted for direct mailing to the addressee. Either it must be hand delivered or else enclosed in a window envelope for mailing. Neither of these practices is considered economical today, and the trend now is toward a postcard type of bill in which the address A is printed on the back of the sheet, as shown in Fig. 3, for instance. Under the prevailing practice this necessitates printing the bills in two runs or passes. First the billing data is printed on the front of each bill, then the address is printed on the back thereof in a separate operation. There is always a danger, of course, that the addresses will be improperly matched with the billing data, and special precautions must be taken to prevent this from occurring.

The present invention enables a postcard bill (Figs. 2 and 3) to be printed in one operation using printing elements located in front of the sheet to print both the accounting data on the front of the sheet and an address on the back of the sheet. The printing of the address is accomplished by employing reversed type character formations and making an impression therewith on the reverse side (back) of the sheet. In the prior art it has not been considered feasible to print a bill in this fashion because, with permanent type faces, a special set of reversed type faces would have to be provided for printing only upon the back of the sheet. By using a convertible-type machine, however, it is possible to form type faces optionally in an obverse or reverse relationship as desired.

Figure 4:
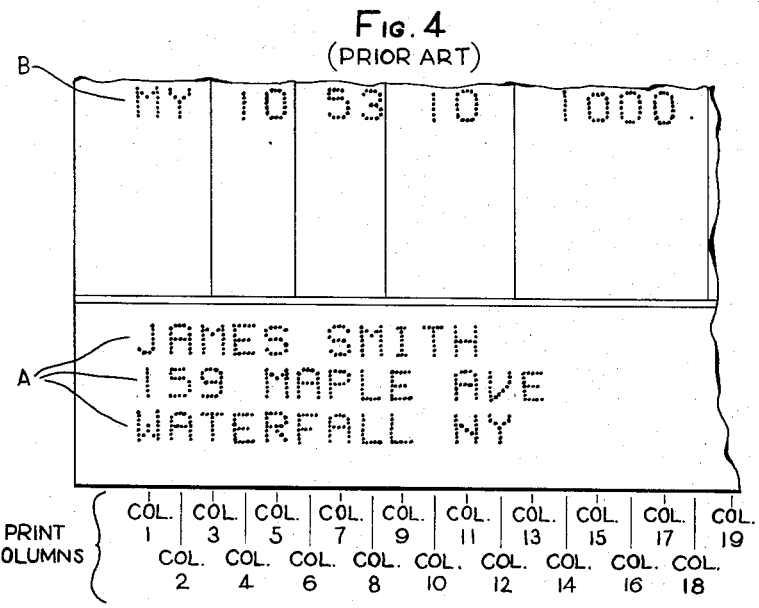
Figs. 4 and 5 are enlarged fragmentary views of the business instruments respectively illustrated in Figs. 1 and 2.
Figure 5:
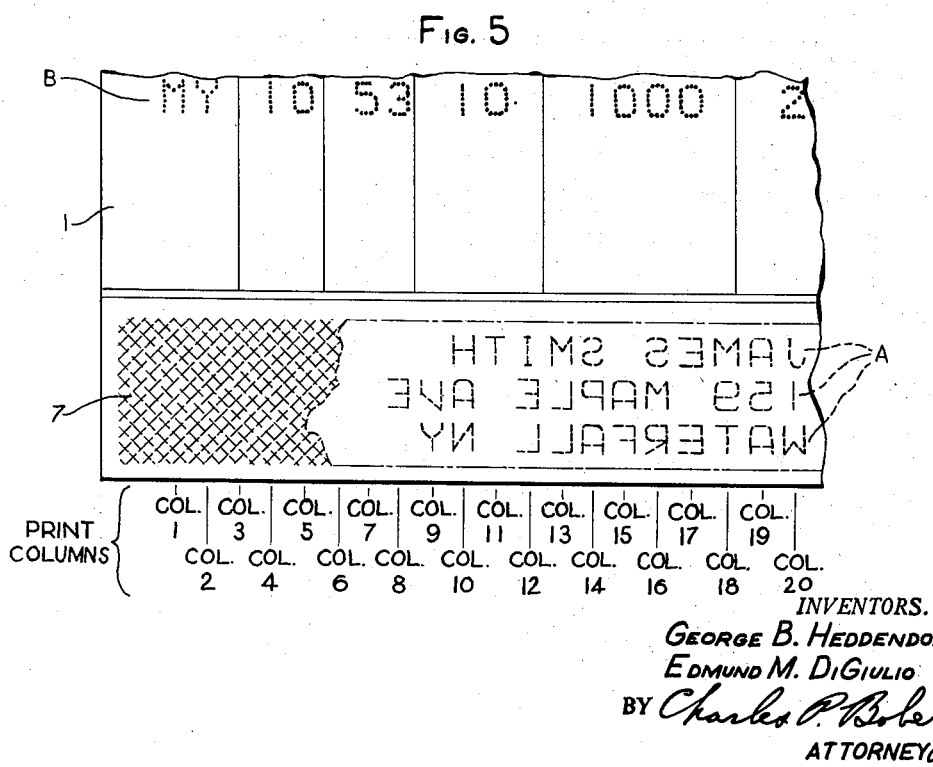

Thus, referring to Figs. 2, 3 and 5, it is contemplated that the printing elements in certain columns will be operated so that in one instance they form obverse type faces for printing the billing data B upon the front of the sheet 1, and in another instance they form reverse type faces for enabling impressions of the address data A to be made therefrom on the back of the sheet 1 (as will be explained presently). It is evident, of course, that the type character formations in each instance will tend to print simultaneously upon both sides of the sheet 1 if inking means are available on both sides. Therefore, provisions must be made to selectively obscure or suppress the printing of information where it is not wanted, as will be described later. Provisions also must be made for transposing the sequence of the character formations when impressions are being made on the reverse side of the sheet. Referring to Figs. 4 and 5, when the information which ordinarily would be printed on the front of a sheet is being printed on the back instead, arrangements are effected for causing the character formations that normally would appear in column No. 1, for example, to appear in, say, column No. 20 (as shown in Fig. 5), looking from the front of the sheet. This procedure also will be described hereinafter.

Figure 6:
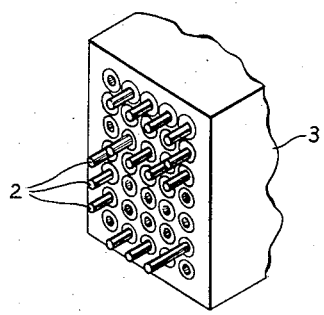
Figs. 6 and 7 are isometric views of printing heads with obverse and reverse formations of wires for printing the same character respectively upon the front and back surfaces of a sheet.
Figure 7:
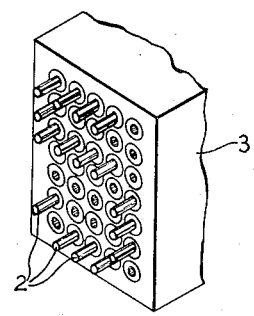
Figure 10:
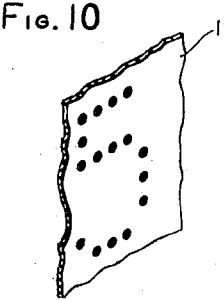
Figs. 10 and 11 are isometric views respectively illustrating portions of the front and back surfaces of a sheet on which impressions have been made by the obverse and reverse type character formations respectively shown in Figs. 6 and 7.

Figs. 6 and 7 illustrate the manner in which a mosaic of 35 wire printing elements may be operated selectively to form type faces in obverse and reverse fashions according to the invention. Assuming first that the character "5" is to be printed upon the front of the sheet, the printing wires 2 are actuated in the manner shown in Fig. 6 to form the type face for the character "5" in obverse fashion. (Actually the extended wires 2 form the pattern of a figure "5" in reverse, as viewed in Fig. 6; however, this kind of a character formation will be referred to herein as an "obverse" one, inasmuch as it is adapted to print upon the obverse or front surface of a sheet.) The printing head 3 in which the 35 printing wires 2 are mounted is located in proximity to a platen 4, Fig. 8. The wires 2 which are extended from the head 3 make an impression upon the front surface of the sheet 1 through an inking medium 5, Fig. 8, thereby printing the character "5" in dot form on the front of the sheet 1, as shown in Fig. 10.

Generally the impression is made by driving the selected wires 2 against the platen 4. The other wires remain within the head 3 out of contact with the inking medium 5 and the paper 1. An alternative method would be to hold the selected wires 2 in extended relation and drive the platen 4 against them. Although the present disclosure shows only the first method of printing, the invention may be adapted equally well to either method.

Figure 9:
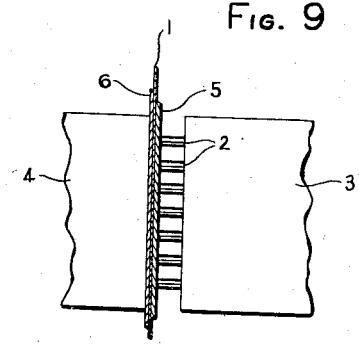
Figure 11:
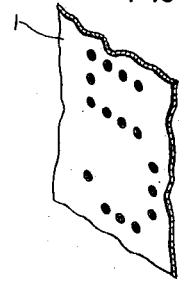

To print the character "5" upon the back of the sheet 1, the wires 2 are extended selectively in the pattern illustrated in Fig. 7 to form the type face for the character "5" in reverse. (Actually this type character formation appears to be in obverse relationship as viewed in Fig. 7, but since it is the reverse of the normal type character formation and is adapted to print upon the back or reverse side of a sheet, it will be referred to herein as a "reverse" formation. As mentioned above, the terms "obverse" and "reverse" are intended to have only relative significance herein.) With the reverse type character formation of Fig. 7 being used to make the impression, an inking medium 6, Fig. 9, is employed between the sheet 1 and the platen 4, thereby enabling the wires 2 to form an imprint of the character on the back of the sheet 1 as shown in Fig. 11. In other words, the extended wires 2 coacting with the platen 4 (Fig. 9) will press certain areas on the back of the sheet 1 against the inking medium 6 to form the dot pattern shown in Fig. 11, which represents the figure "5" in normal reading fashion.

In the course of printing a character on the back of the sheet, the printing elements or wires 2 acting through the front inking medium 5, Fig. 9, will also tend to make an imprint of the same character in reverse on the front of the sheet. The reverse printing on the front of the sheet can be obscured by means of a printed mask or blacked-out area 7, Fig. 2, on the front of the sheet 1, this mask 7 being a part of the preprinted format of the bill.

Figure 8:
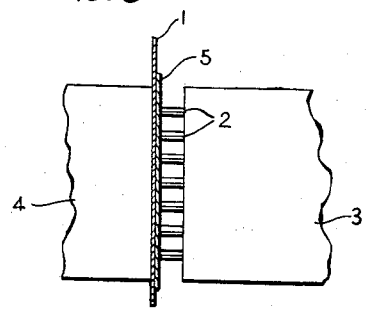
Figs. 8 and 9 are elevational views illustrating portions of the mechanisms for printing the front and back surfaces of a sheet, respectively, utilizing the obverse and reverse type character formations shown in Figs. 6 and 7.
Figure 12:
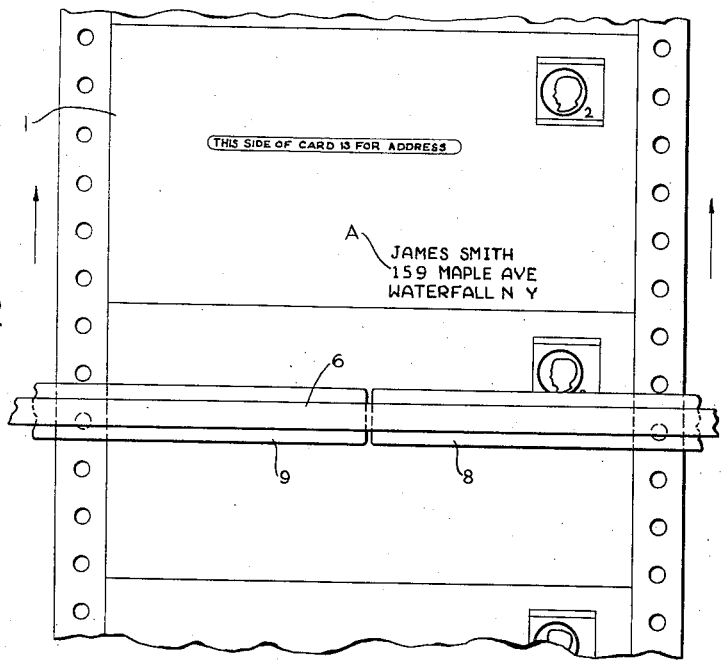
Fig. 12 is a plan view showing a portion of a printing means for enabling characters to be printed on the back of a sheet.

The inking medium 6, Fig. 9, has not been shown in Fig. 8. However, it is obvious that if the inking medium 6 is present when characters are being printed upon the front of the sheet, it will tend to produce reverse imprints of the same characters on the back of the sheet, unless steps are taken to suppress the reverse printing on the back of the sheet. Referring to Fig. 12, wherein the inking medium 6 is represented in the form of a ribbon, it is proposed to mount a removable interposer or shield 8 between the ribbon 6 and the back of the sheet 1. This interposer 8 is in the position shown in Fig. 12 when it is desired to suppress printing, and it is removed to permit each address A to be printed. A fixed shield 9 is used to cover those portions of the sheet 1 beneath the ribbon 6 on which no imprint is to be made under any circumstances.

Figure 13:
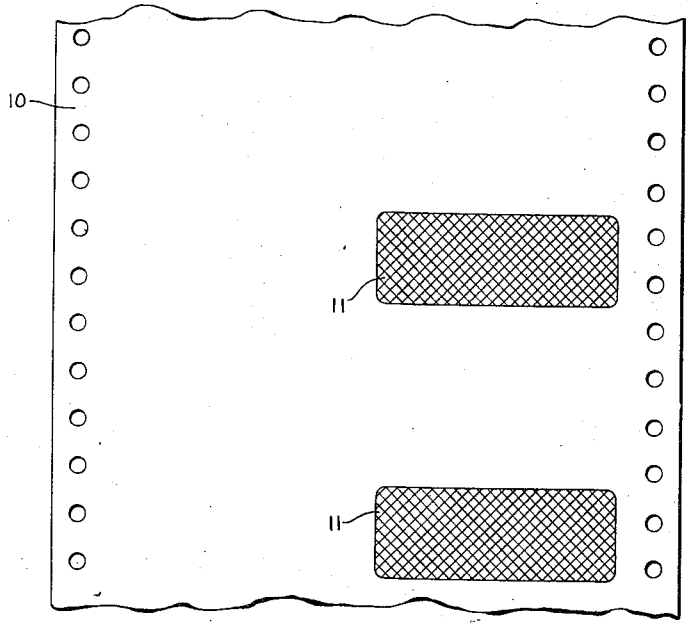
Fig. 13 is a plan view of a "spot carbon" sheet which may be used in an alternative method of back-printing.

Fig. 13 illustrates an alternative form of inking medium comprising a sheet 10 which travels with the sheet 1 (Fig. 12), and which carries carbon spots 11 thereon at the places where the various addresses are to be printed on the sheet 1. With this type of inking medium it is not necessary to use mechanical interposers, since printing cannot occur on the back of the sheet 1 except in those areas that are covered by the carbon spots 11.

Figs. 16 and 17 illustrate the manner in which the various wire printing elements 2 are supported within the machine. As shown in Fig. 16 each wire 2 is slidably mounted within a guide tube 12, there being 35 of these tubes 12 in each printing head 3. The wires 2 terminate flush with the outer surface of the head 3 when they are in non-print position. When in printing position, each wire 2 projects beyond the outer face of the head 3 against the paper 1 and the platen 4. The particular means for actuating these wires will be disclosed in detail presently. Each head 3 is mounted on a support 13 which is carried by a frame 14, Fig. 17. Mounted within the frame 14 is a body of plastic material 15, Figs. 16 and 17, through which the guide tubes 12 extend. The plastic material 15 serves to anchor the guide tubes 12 for preventing movement thereof when the printing wires 2 are actuated. At its lower end each wire 2 is secured to a short connecting rod 16, Fig. 16, that extends into and is movable within the upper portion of a coupling member 17. A rod 19 (see Figs. 15 and 18) is threaded at its upper end into the lower end of each coupling 17, and a coil spring 18 is interposed between the rods 16 and 19 within the coupling 17.

In practice the various printing heads 3, Figs. 6 and 7, of which there will be one for each column on the sheet, will be disposed in a row extending across the front of the sheet. Certain printing heads will be called upon to print characters on the front of the sheet in certain lines and on the back of the sheet in other lines. For example, referring to Fig. 5 (in which the mask 7 has been partially deleted), the printing heads in the first 20 columns will have to print billing data B at one time and address data A at another time, all in the same printing operation. Furthermore, it will be observed that some of the billing data (for example, the amount B', Fig. 2) may be disposed on the same line but on the opposite side of the sheet from some of the address data, requiring that certain printing heads be operated in obverse fashion at the same time that other printing heads are operating in reverse fashion. The controls which are provided for effecting these results will be described subsequently. First, however, a brief description will be given of a mechanism which is adapted to actuate the individual wires of a single printing head.

Figs. 14, 15 and 18 illustrate a form of selective wire actuating mechanism which is fully disclosed and claimed in the above mentioned Rast Patent No. 2,681,614. This mechanism is disclosed herein merely for purposes of illustration, it being understood that equivalent structures can be devised for carrying out the objectives of the invention. The particular mechanism shown in the aforementioned views is one of a number of similar units employed in the machine for actuating the various rods 19 that are coupled to the wire printing elements 2. That is to say, the machine employs as many of these structural units as are needed to operate all of the rods 19 and their associated printing wires 2.

As shown in Figs. 14, 15 and 18, the framework of each unit includes vertical side walls 21 and 22, which are suitably supported by the frame of the machine. At their inner ends the walls 21 and 22 have extensions 24 into which vertical supporting rods 26 are threaded at their lower ends. Extending horizontally between the supporting rods 26 are one or more guide members 27. Each guide member 27 is formed from a flat sheet of metal bent upon itself (Fig. 18) and is provided in its lower edge with a series of openings 28 through which pass the rods 19 of the printing elements. The ends of each guide member 27 are respectively provided with sleeves 30 through which the rods 26 extend, and the lowermost guide members 27 has its sleeves resting directly upon the extensions 24 as shown in Figs. 17 and 18. The other guide members 27 are mounted in vertically spaced relation by spacer sleeves 31 which are removably mounted upon the rods 26 and interposed between the sleeves 30 of adjacent guide members. The above mentioned frame 14, Fig. 17, is secured to the upper ends of the rods 26 by nuts 33. The side walls of the frame 14 converge upwardly, and their upper ends are connected by a supporting member 13 on which one or more printing heads may be mounted. A sufficient number of these structures are employed in the machine to support all of the printing heads in aligned relationship.

In the embodiment being described, each wire printing element is under the control of an individual electromagnet 38, the energization of which produces an action that causes said printing element to be propelled from its non-print position to its print position. The manner in which this is accomplished will appear in the course of the following description. There are 35 of the magnets 38 for each printing head, or that is to say, one magnet 38 for each wire in said head. As best shown in Figs. 14 and 15, the magnets 38 are supported by means of cross bars 48 secured to the upper edges of the side walls 21 and 22 and spaced therealong, with the core piece 49 of each magnet 38 being secured to one of said bars. Each core piece 49 has pivoted thereto a spring control armature 50. The lowermost magnet 38 shown in Fig. 14, and which is the one at the left in Fig. 15, is shown energized while the armatures of the remaining magnets in said two figures are in normal position. As will be noted by reference to Fig. 14, the three lowermost magnets 38 in this view are arranged in longitudinally offset relation, and each is supported by a different bar 48. This staggered arrangement is carried out with respect to all similar groups of magnets throughout the unit in order that their associated parts which control the operations of the various printing elements may be assembled in compact relationship.

Each of the magnets 38 has assigned thereto an oscillatory interposer 51 (Fig. 15), and said interposer is connected at its upper end to one of the rods 19 so that, in effect, it forms a part of a printing element. Each interposer 51 also is joined to the armature 50 of a magnet 38 by a connector 52, with the forward end of each connector 52 having a pin-and-slot connection with its interposer 51. Each connector 52 has an extension 53 which projects horizontally to the right (as viewed as Fig. 15) and beneath its associated magnet 38. From left to right in Fig. 15, the extensions 53 of the various connectors 52 become increasingly longer and all of them are supported for slight sliding movement upon a crossbar 54 which is mounted on a platform 55 extending between the side walls 21 and 22. The extensions 53 are guided by combs 56 secured to the bars 48 and engaged in the bars 54, and the connectors 52 are further guided adjacent the interposers 51 by another comb 57.

At a predetermined time in each operating cycle all of the interposers 51 are oscillated in unison from their inoperative positions, in which they dwell for a considerable portion of the cycle, to an operative position by means of a bail 58, the operation of which will later be described in detail. When the interposers 51 are so operated, they act through the connectors 52 to move the armatures 50 of all the magnets 38 in such a manner as to close the respective gaps between these armatures and their associated cores. The timing of this action is such that any printing element which is to be propelled to its print position has its associated magnet 38 energized after the closure of its armature gap and before the interposer 51 connected thereto can be returned to its inoperative position by the action of the armature spring.

The energized magnet 38 thus momentarily retains its interposer 51 in operative position while all the other interposers 51 whose magnets 38 are not energized return to inoperative positions under the influence of the armature springs. The bail 58 is restored a very short time interval after having moved the interposers 51 to their operative positions. It is during the time when the selected interposers 51 are being held in their operative positions that they have imparted thereto an upward movement which is transmitted, through the rods 19, to the print wires 2 for propelling these wires to print position, where they dwell for an instant and are then restored to non-print position by a reverse or downward movement of the interposers 51.

The operation of propelling the operative interposers 51 and their printing elements (wires 2) to print position and then returning the interposers 51 to restore said printing elements to non-print position is accomplished by two shafts 59 and 60 (Fig. 15) connected by gears 60a (Fig. 18) to rotate continuously in opposite directions as indicated by the arrows. The shaft 60 is coupled through bevel gears 129 and 128 (Fig. 14) to a drive shaft 127, the prime mover of which is not shown. The shaft 59 carries the actuator member 61 common to all the interposers of the print unit and which, following the energization of any of the magnets 38 with the consequent momentary retention of their interposers 51 in operative positions, will engage the shoulders 62 of said interposers and thereby impart upward movement thereto. This drives the selected wires 2 (Fig. 16) against the platen 4. Those interposers 51 which are not retained in their operative positions, because of the non-energization of their magnets 38, are restored to inoperative positions by the armature springs of said magnets before the actuator 61 contacts the shoulders 62 of the operative interposers 51. The shaft 60, rotating in the opposite direction, carries a restoring member 63, also common to all interposers, and so positioned in angular relation to the member 61 on the shaft 59 that after the latter member disengages from the shoulders 62, said member 63 engages the shoulders 64 of all elevated interposers 51 and, by its rotation, restores said interposers (and their connected printing wires) to their normal or lowered positions with the result that the printing wires connected to said interposers are also restored to non-print position. This action occurs at the beginning of the next operating cycle and after all the magnets 38 are deenergized so that their armature springs will actuate the connectors 52 to thereby return the interposers to their inoperative positions preparatory to the start of the succeeding cycle of operation. The restoration of the interposers 51 occurs with the bail 58 in its normal position, to which it returns immediately after having advanced the interposers to operative position.

The bail 58 is supported by a rocking member 67 mounted on trunnions 68, 68a (Fig. 18) having bearings in the extensions 24 of the side walls 21 and 22. The means for periodically oscillating the rocking member 67 of each unit, and consequently the bail 58 thereof, is controlled from the continuously driven shaft 59, which is provided at one end (Figs. 14 and 18) with a gear 122 meshed with a similar gear 123 supported for rotation by the side wall 21. Said gear 123 carries the complemental cams 124 each of which is engaged by one of the rollers 125 of a rocking follower 126 secured to the end of the trunnion 68a projecting from the wall 22. The cams are so formed that as they rotate through the initial portion of the operating cycle, the follower 126 remains stationary and, therefore, the rocking member 67 and its bail 58 do not move. Then said cams being to rock the follower and, in so doing, the bail 58 is actuated to move the interposers 51 toward their operative positions which they reach at the time of the energization of the magnets 38 selected for energization. The cams 124 then maintain the bail and its interposers in their operative positions for a short duration, sufficient for the selected magnets 38 to become fully energized, whereupon said bail is restored by the reversal of the follower 126 under the influence of said cams to thus permit those interposers which are not held in operative position by their magnets to return to normal by the action of the armature springs of the associated magnets. This restoration of the interposers is completed before the actuator 61, Fig. 15, engages with the shoulders 62 of the operative interposers 51 to advance the selected printing elements.

As mentioned hereinabove, the present invention is particularly (though not exclusively) applicable to high-speed record-controlled printers which utilize wire printing elements. Fig. 19 is a schematic layout of a printing machine which is controlled by record cards for printing business instruments of the type illustrated in Figs. 2, 3 and 5 in accordance with the principles of the invention. It is contemplated that the various lines of billing data B, Fig. 2, will be printed under the control of one or more billing cards 130, Fig. 19, and that the various lines of the address A will be printed under the control of one or more address cards 132, Figs. 19 and 20. The billing cards 130 and address cards 132 are fed in predetermined sequence from a magazine (not shown) through a series of sensing or reading stations defined by the contact rolls 73, 73a and 73b. At each of these stations there are provided certain card sensing brushes (only a selected few of which are shown in Fig. 19) there being one such brush for each card column which is to be read. Each card sensing brush is electrically connected to one of a plurality of brush exit hubs 134, 134a or 134b on a pluggable control unit 136. The plugging of this control unit will be described in greater detail presently.

In the embodiment of Fig. 19 it is assumed that the billing cards 130 are read at the first sensing station only, whereas the address cards 132 are read at all three sensing stations. This assumption is made merely to simplify the description and is not to be considered as limiting the invention. Each business instrument produced by the machine (Figs. 2 and 3) will be printed under the control of at least one billing card 130 and one address card 132. The billing card or cards 130 associated with each instrument will be fed in advance of the address card or cards 132 associated therewith. Fig. 19 illustrates a phase in the operation when the last of a series of billing cards 130 (only one of which is shown) is being read at the first station, and the first (or sole) address card 132 in the series is still in the magazine.

At the first sensing station, which is defined by the contact roll 73, the various columns of the billing card 130 are sensed by the corresponding card sensing brushes, of which Nos. 1, 20 and 80 are shown, these being the brushes respectively aligned with column Nos. 1, 20 and 80 of the card. The impulses picked up by these brushes are routed by plugwires 135 to hubs 138. As many of these hubs 138 are utilized as there are active columns on the card. Each hub 138 is connected internally through a relay contact 139 to a corresponding hub 140 on the control unit 136. The relay contacts 139 are respectively controlled by brush relays 141 which in turn are under the control of a program unit 142, Fig. 19. The program unit 142 is of well known construction, its purpose being to govern the various operations of the machine and insure proper sequential timing thereof.

At the time when a billing card 130 is passing the brushes at the first reading station, the program unit 142 causes the brush relays 141 corresponding to the active card columns, to close their respective contacts 139 for establishing electrical connections between the pairs of hubs 138 and 140. Later, when an address card 132 is being sensed at the first station, the brush relays 141 again will be operated, although in this case only a selected number of these relays may become energized since not all of the address fields will be read at the first station. The particular way in which the program unit 142 governs the operations of the brush relays and other control devices in the machine is not material to the present invention; moreover, these techniques are well known in the art and hence need not be described herein.

Certain of the hubs 140 on the control unit 136 are connected by plugwires such as 144 to certain of the print entry hubs 146 on said control unit, there being one of these hubs 146 for each column of printing. If it is known in advance that certain columns will not be printed under any circumstances, the corresponding plug connections 135 and 144 may be omitted. Where there is a problem of transposing columns, as is the case with columns 1 to 20 (Fig. 5), the connections between the hubs 140 and 146 of those columns are effected through the contacts of selector relays 148, Fig. 19, which are included in the control unit 136. Each selector relay 148 has a set of plug hubs designated C, N and T, respectively signifying "common," "normal" and "transfer." These hubs are internally wired to the contacts of their respective selector relays 148 as indicated in Fig. 19. The hubs 140 are plugged directly to the C hubs of their selectors. The N hubs of these selectors are plugged directly to corresponding print entry hubs 146. Under normal conditions, therefore, the hub 140 of card column No. 1, for example, is connected electrically to the hub 146 of print column No. 1.

During a different part of the operation, when an address card 132 is being sensed, the selector relays 138 may become energized to break the connections between the C and N hubs and establish alternative connections between the C and T hubs. The T hubs are plugged in such a fashion that, for example, the T hub for card column No. 1 is connected to the entry hub 146 for print column No. 20, while the T hub for card column No. 20 is connected to the entry hub 146 of print column No. 1. This effects a transposition of columns which is necessary in the case of reverse printing.

Each address card 132, Fig. 20, is divided into fields that are allocated respectively to the various lines of the address. In the present case it is assumed that the first 20 columns of the address card 132 are allocated to the first line of the address; the next 20 columns (21 to 40) are allocated to the second line of the address; and the next 20 columns (41 to 60) are allocated to the third line of the address. Furthermore, it will be assumed that each address card 132 has, in its 80th column, a special perforation 150 which identifies the card as an address card. This special perforation 150 is adapted to be sensed by a sensing device 152, Fig. 19, while the card is still in the magazine, to detect the presence of an address card and thereby condition the machine for a special sequence of operations. Sensing devices of this kind are well known, and at this point it will be stated merely that upon detecting the perforation 150, the sensing device 151 closes a circuit 153 to condition the program unit 142 for a special sequence of operations. By this it is meant that certain brush relays 141 will be operated to close their contacts 139 when the address card 132 reaches the first sensing station; certain other brush relays 141a will be operated to close their contacts 139a when the address card 132 reaches the second sensing station, and still other brush relays 141b will close their contacts 139b when the address card 132 reaches the third sensing station. This conditions the sensing brushes associated with the active columns of the address card at each of the three stations to become effective at the proper times for routing impulses through the control unit 136 to the appropriate print entry hubs 146.

The various plug connections illustrated on the control unit 136, Fig. 19, are such that each time a line of the address is read from a card 132, an inversion or reversed transposition of columns takes place. Thus, for instance, information read from card column No. 1 (beginning of first line) is routed to print column 20; information read from card column 21 (beginning of second line) is routed to print column 20; and information read from card column 41 (beginning of third line) likewise is routed to print column 20. In the case of the second and third lines, these transpositions can be effected by direct plugwire connections as shown, but in the case of the first 20 columns containing the first line of the address, an arrangement of selectors is provided as aforesaid so that information read from column Nos. 1 to 20 of a billing card 130 is routed directly to print columns 1 to 20, respectively, whereas information read from the first 20 columns of an address card 132 is routed in transposed relation to print columns 20 to 1, respectively.

Each of the print entry hubs 146 is connected by a conductor 105, Fig. 19, to one of a plurality of decoding chassis 152, in each of which the differentially timed code impulses derived from the sensed record card are converted into static equivalents as represented by the potentials applied to an array of conductors 71. These conductors 71 may lead either directly or through the medium of adapters 156 to corresponding print units 154. Each print unit 154 (of which there is one for each print column) comprises a printing head 3, Figs. 6 and 16, together with its associated magnets 38 and intermediate mechanisms, Fig. 15. The adapters 156 are provided for the purpose of reversing the type character formations of those printing heads which are to effect printing upon the reverse side of the sheet.

The internal construction of the decoding chassis 152 and adapters 156 will be described presently, but for the present it will merely be stated that each chassis 152 decodes the differentially timed signal as though the corresponding type face were to be formed obversely for printing the character upon the front of the sheet. In the case of billing data, the pattern of potentials on the wires 71 is transferred without change (either directly or through the adapters 156) to the print units 154. In the case of address data, the adapters 156 function to reverse or invert the pattern of potentials on the wires 71, causing the type faces to be formed in reverse for printing upon the back of the sheet.

The adapters 156 are controlled by adapter relays 158, Fig. 19, which are governed by the sensing device 151. When the sensing circuit 153 is closed, certain sequence relays 160 and 161 in the program unit 142 are energized, and when the timing cam C6 closes its contact, the gas tube 162 is fired. A relay 164 in the anode circuit of the gas tube 162 is energized when the tube fires and closes its contacts 164a and 164b to energize the selector relays 148 and the adapter relays 158, thereby conditioning the machine for printing on the reverse side of a sheet.

The amount of the bill B', Fig. 2, may be read from a billing card or, alternatively, from the readout device of an accumulator (not shown). In either event it will be handled in the same fashion as other billing data insofar as the printing units are concerned. That is to say, the digits of the amount B' are represented initially by timed impulses, which must be converted into static potentials before they can be effective to operate the printing elements.

The internal circuitry of each decoding chassis 152, Fig. 19, is illustrated in Figs. 21 and 22. As stated before, the function of such a decoding chassis is to convert a differentially timed signal on the conductor 105 (connected indirectly to a card sensing brush), Figs. 19 and 22, into a pattern of potentials on the 35 conductors numbered 71, which pattern is indicative of a character to be printed. This pattern is the same regardless of whether the type face will be formed in obverse or reverse order. If any reversal is to take place, the reversing function will be performed by an adapter 156, Fig. 19, the internal circuitry of which is shown in Fig. 23. The decoding circuitry shown in Figs. 21 and 22 is substantially the same as that disclosed in the aforesaid Rast Patent No. 2,681,614. The adapter circuitry shown in Fig. 23 is disclosed for the first time in the present application.

Before proceeding further it should be explained that the term "decoding scheme" as employed herein is intended to include both the decoding chassis proper, Figs. 21 and 22, and its associated adapter, Fig. 23. In fact, there are actually present in these views (Figs. 21–23) two decoding schemes, one of which is effective when the adapter (Fig. 23) is conditioned for obverse printing, and the other of which becomes effective when said adapter is conditioned for reverse printing. The control indicium (perforation 150, Fig. 19) which determines the condition of the adapter, therefore, selects one of the two available decoding schemes.

Referring again to Figs. 21 and 22, the decoding circuitry therein shown is designed for operation with incoming signals that are coded in accordance with the familiar twelve-hole statistical code. As is well known, this is a code for representing any numerical or alphabetical character by means of one or two code elements out of a possible twelve. These code elements, in the present instance, are represented by differentially timed electrical pulses coming over the line 105, Fig. 22, from a sensing brush that cooperates with one of the contact rolls such as 73. That is to say, each time the aforesaid sensing brush encounters a perforation in its respective card column, a pulse is sent over the line 105 to the decoding chassis. The various pulses are utilized in a selective manner to register sensed code representations in a memory or storage means comprising the twelve gas tubes 76, 77, 78 and 86–94, Figs. 21 and 22.

A distributor 75, Fig. 21, is synchronized with the feeding of the cards so that the wiper thereof successively engages its twelve contacts in step with the sensing of the twelve index points in each card column. This distributor 75 sequentially conditions the twelve gas tubes so that each time a perforation at a particular index point in the card is sensed, a corresponding gas tube is fired. Thus, if a perforation is sensed in one of the index points numbered 12, 11 or 0 (these being the zoning positions for alphabetical or other non-numerical printing), a corresponding gas tube 76, 77 or 78 is fired. The anodes or plates of these tubes are connected respectively to zoning relays 79, 80 and 81 which become energized when their associated tubes 76, 77 and 78 are fired.

Energization of relay 79 signifies that the character to be printed is an alphabetical character in the group A to I, as indicated by the closing of the nine relay contacts A to I, Fig. 21. In the same manner, energization of relay 80 or 81 establishes that the character to be printed is in the J to R group, or the S to Z group, respectively. The contacts A to Z of the various zone groups are connected to different groups of the conductors 71 leading to the magnets 38, Fig. 23, so that when final selection of any contact in any one of said groups is made, in a manner to appear later, by the sensing of the second hole in a card column, the magnets 38 assigned to said contact will be energized, and their respective printing elements will be advanced to print position. A fourth zoning relay 82, Fig. 22, is assigned to the numerals 1 to 9, but if any one of the tubes 76, 77 or 78 is fired, a relay 83 multipled to the cathode elements of said tubes is energized and, by opening its back contact 84, will disconnect relay 82 from the power supply 85 (Fig. 21). On the other hand, if no zoning tube is fired to effect the printing of an alphabetical character (due to the absence of a perforation at any one of the zoning index points), relay 82 will be energized to close its group of contacts 1 to 9, shown at the right of Fig. 22, to await the sensing of a hole in the card column designating the particular numeral to be printed.

With any one of the tubes 76 to 78 rendered conductive and its corresponding set of alphabetical contacts closed, the second hole of the two-hole combination in the card column is then sensed by the associated brush and, through the distributor 75, this results in the firing of one of the nine gas tubes 86 to 94 identified by the sensed hole, thereby causing circuits to be established through one of said sets of alphabetical contacts in the selected zone to a selected group of magnets 38 which is to control the printing of the particular alphabetical character. Rectifiers 96 are interjected in all circuit groups at points where it is desired to prevent the shunting effect of unrelated circuit groups which may have connection to the same conductor.

As a specific example, it will be assumed that the letter "A" is to be printed. To print this character (in either obverse or reverse order) it is necessary that energizing potentials to be applied to the wires 71 associated with the magnets 38 of the eighteen printing elements numbered 2, 3, 4, 6, 10, 11, 15 to 21, 25, 26, 30, 31 and 35 (Fig. 24). These numbers also are used in Fig. 23 to identify the terminals on the bus bar 69 to which the magnets 38 respectively are connected. Hence the contact A, Fig. 21, is connected by the group of conductors 95 to the eighteen conductors 71 through which the circuits of the selected magnets 38 will be energized.

A typical cycle of operation for printing a character will now be described, specifically in connection with the printing of the letter "A." This involves the successive sensing of the punched index points Nos. 12 and 1 in a card column, which sensing results in the firing of the tubes 76 and 86, Figs. 22 and 21, respectively. Immediately upon entry of the leading edge of a card between a contact roll such as 73 and its associated sensing brushes, the code holding cam C1 (Fig. 22) closes its contact and remains in this condition throughout the entire operating cycle (which includes the printing of the selected characters). At the beginning of each cycle, the three zoning tubes 76 to 78 and the nine numeric tubes 86 to 94 and non-conductive due to the application of a negative bias from the power source 85 through the bridge network of each tube to the grid thereof and, upon closure of the contact of holding cam C1, positive voltage is applied to the plate elements of the tubes 76 to 78 from the source 85 over the conductor 97, through the contact of said cam, the conductor 98 connected to the bus 99 common to all the printing heads and the windings of the respective relays 79 to 81. The card brush now successively senses the index points Nos. 12, 11 and 0 and, simultaneously therewith, the wiper of the distributor 75 successively engages the numbered contacts corresponding to said points. Since the index point No. 12 is punched for the letter "A," contact by the brush will be made with the roll and, with the distributor wiper simultaneously engaging its contact No. 12, zero potential from the intermediate or ground terminal of the source 85 will be applied through the conductor 100, the No. 12 contact of said distributor, and the conductor 101 to one midpoint of the bridge network connected to the grid of the zoning tube 76 and, at the same time, said potential is connected, by said conductor 100, to the other midpoint of said network over the conductors 102 and 103, a contact roll such as 73 and an associated brush, and the conductor 105. The grid voltage is thereby raised for causing said tube 76 to fire, whereupon current will flow from the positive terminal of source 85 through the cam C1, the windings of relays 79 and 83 connected, respectively, to the plate and cathode elements of the tube 76, and then over the conductors 102 and 100 to the intermediate terminal of the source 85, and said relays will be energized and held by the cam C1. Energization of relay 83 opens its back contact 84 to thereby disconnect the positive terminal of the source 85 from the winding of the numerical zoning relay 82 and thus prevents the latter from closing its contacts 1 to 9. Relay 79 closes its group of contacts A–I, and thus the zone of the character to be printed now has been selected.

The card being analyzed now passes its No. 11 and No. 0 index points under the sensing brush but, since no hole is punched at either of said points, the tubes 77 and 78 are not fired and, consequently, the other two sets of alphabetical zone contacts of relays 80 and 81 remain open. Immediately upon completion of the sensing of the three zoning points on the card, the numeric tube holding cam C2 is operated to close its contact to thereby prepare a holding circuit for any one of the subsequently fired numerical tubes 86 to 94, said circuit extending from the positive terminal of source 85 through the contact of cam C2, and the conductor 106 connected to the bus 107 to which all similar conductors of the circuits for the remaining print heads are joined, said conductor 106 being connected through a resistance to the plate element of each of said numeric tubes. Said cam C2 maintains its contact closed throughout the sensing of all nine numerical index points, and until the printing elements have been advanced to their printing positions.

The sensing brush now senses the hole punched in the No. 1 index point which completes the combinational code for the letter "A" and, at the same instant that said hole is being sensed, the numeric zone cam C3 (Fig. 21) closes its contact and holds it closed, for a purpose which will later appear, until the printing operation is completed. When hole No. 1 is sensed in the card, the wiper of distributor 75 also engages its No. 1 contact, thereby connecting zero or ground potential from the source 85 over the conductor 100 and 108 to one midpoint of the bridge network of tube 86, while the other midpoint of said network is connected to said potential over the conductors 102 and 103, the contact roll and brush, and conductors 105 and 109, thus raising the grid voltage of said tube to zero and causing the same to fire. The tube 86 is maintained conductive so long as cam C2 maintains its contact closed.

Upon the sensing of the last or No. 9 position in the card, the print cam C4, Fig. 23, closes to establish circuits from the positive terminal of the source 85 for the energization of the eighteen previously mentioned magnets 38 whose associated printing wires form the letter "A," said circuits extending from the positive terminal of source 85 over the conductor 97, the contact of cam C4, conductor 70 and bus 69, the windings of the eighteen devices 38, contacts of the adapter relays 158 (presently to be described), the conductors 71 connected to said windings, the conductors 95 (Fig. 21), the contact A of the zoning relay 79, and the tube 86 to the intermediate terminal of the source 85. The selected magnets 38 now energize, as previously described, and cause the respective printing elements to be advanced to their print position. During the initial stage of the sensing of the card, the bail 58 dwells in the position shown in Fig. 15 and then advances to move the interposers 51 toward their operative positions which they reach at the instant that the print cam C4, Fig. 23, is closed. Said bail 58, Fig. 15, then dwells for a short period and recedes to its normal position in sufficient time to permit the restoration of all inoperative interposers before the actuator 61 engages those interposers which are active. The printing elements connected to the latter interposers are then propelled upwardly and dwell for a very short period until the end of the current card cycle is reached, whereupon they are returned by the restoring member 63 at the beginning of the next card cycle.

In the event that no one of the three zoning tubes 76 to 78, Fig. 22, is fired due to the failure of the associated brush to sense a hole in the three zoning points on a card, thus indicating that a numerical character is to be printed, it will be apparent from the foregoing that relay 83 connected to the cathode elements of said tubes will not be energized and therefore its back contact 84 will remain closed. Hence, as soon as the cams C1 and C3 close their contacts, an energizing circuit for the numerical zoning relay 82 will be established extending from the source 85 through the conductor 97, the contact of cam C1, conductor 98, winding of relay 82, back contact 84 of relay 83 and the contact of cam C3 of the intermediate terminal of the source 85. Upon energization of relay 82 in this circuit, its group of numerical contacts 1 to 9 are closed and await the sensing of the hole punched in one of the numerical index points in the card column. When this occurs, zero potential will be applied to the grid of one of the tubes 86 to 94, depending upon which hole is sensed, through the sensing brush and the distributor 75 in a manner which has been explained. Said tube will then fire and will remain conductive through the contact of cam C2 and conductor 106, as previously described. Upon closure of the printing cam C4 at the conclusion of the sensing of the last index point of a card, energizing circuits will be established for those magnets 38 which are selected to effect the printing of the desired numerical character, said circuits extending, as previously described, through said cam C4 and over the conductors 71 which are connected to the numerical contact of relay 82 that extends to the plate elements of the fired tube, and from thence the circuit extends to the intermediate terminal of the source 85. Energization of the selected group of magnets 38 causes the associated printing elements to be advanced under the control of the actuator 61 to print the desired numeral.

With respect to the character O, the same is formed by the energization of the same group of magnets 38 whether said character is to indicate a letter or a zero, but the selection of said group to print the letter is accomplished differently than when a zero is to be printed. This difference originates in the code punching in a card column and the consequent firing of different gas tubes during the course of the analysis of said column. The letter O is formed by punching the index points Nos. 11 and 6, while for a zero, only the zoning index point No. 0 is punched. From the foregoing description, it will be understood that selection of the group of conductors connected to the contact 0, Fig. 21, controlled by the "11" zone relay 80, for the energization of the magnets 38 that control the printing of the letter O, may be accomplished by the firing of the zoning tube 77 and the numerical tube 91. When only No. 0 index point position is punched in the card column, indicating that a zero is to be printed, only the zoning tube 78 is fired and, at the conclusion of the sensing of said column, the zero print cam C5 (Fig. 21) is closed. Firing of the tube 78 energizes the relay 81 in series therewith, closing its contacts S to Z, but this will have no effect since none of the numerical tubes 86 to 94 is fired to extend the circuits for the magnets 38 through any one of the latter tubes. However, the closure of the additional contact 111 (Fig. 21) of relay 81 will connect the conductor 112 leading from said contact to the conductor to which the 0 contact of relay 80 is joined, and this will extend the circuits for the energization of those magnets 38 which control the printing of the character O, from the contact 111 over the conductor 114 and the contact of the zero print cam C5 to the intermediate terminal of source 85, whereupon the selected magnets 38 will be energized. At the conclusion of any printing operation, the various control cams heretofore described open their contacts to deenergize all magnets 38 and relays in the various circuits, and again render all gas tubes non-conductive preparatory to the next card analysis.

No zero suppression means has been disclosed herein for suppressing zeros beyond the extreme left-hand significant digit or other character. Such means can readily be provided, however, as shown for example in the abovementioned Rast Patent No. 2,681,614. Inasmuch as such a disclosure would not be essential for an understanding of the present invention, it has been omitted.

The above-described cycle of operations is repeated each time a card is sensed at any one of the sensing stations. The program control means determines which set of sensing brushes will be effective in each of the printing cycles, in accordance with standard programming techniques. The operation of each decoding chassis, Figs. 21 and 22, is the same regardless of which sensing station is operative.

Regarding the means for reversing type character formations to enable printing upon the reverse side of a sheet, it will be noted first of all that the reversal takes place around the center vertical axis of each character. That is to say, it can be effected by interchanging the right-hand elements and the left-hand elements of the character, leaving the center elements unchanged. Thus, referring to Figs. 24, 25 and 26, the type character formation for printing the numeral "5" is shown in obverse order in Fig. 25 and in reverse order in Fig. 26 (it being recalled that the terms "obverse" and "reverse" have only relative meanings herein). In the obverse formation (Fig. 25) the printing elements numbered 1 to 4, 6, 11 to 14, 20, 25, 30 and 31 to 34 (Fig. 24) are active. In the reverse formation (Fig. 26) the printing elements 2 to 5, 10, 12 to 15, 16, 21, 26 and 32 to 35 are active. In each case the printing elements 3, 13 and 33 in the center column are active, and the other printing elements 8, 18, 23 and 28 in the center column are inactive. Hence, the desired reversal can be accomplished merely by interchanging the first and fifth columns, and the second and fourth columns, respectively, and leaving the third column unchanged.

The adapter circuitry shown in Fig. 23 will accomplish this function of reversing the type character formations along the lines just indicated. The adapter relays 158, of which there are four in each adapter unit 156, Fig. 19, control the various sets of "break" contacts X and "make" contacts Y. Each relay 158 controls seven pairs of X and Y contacts. These relay contacts are inserted into the energizing circuits of all magnets 38 except those associated with the printing elements numbered 3, 8, 13, 18, 23, 28 and 33, Fig. 24. Just prior to the instant when the magnets 38 are to be energized in each printing cycle, the timing cam C6, Fig. 19, closes its contact, and if a special control indicium (perforation 150) is sensed, the relay 164 closes its contact 164b to energize the adapter relays 158. Under these conditions the X contacts (Fig. 23) are broken, and the Y contacts are made. This is effective, for example, to interchange the energizing circuit 71 of the No. 1 magnet 38 with the energizing circuit 71 of the No. 5 magnet 38, and so on, thereby causing the type character formation to appear as viewed in Fig. 26, when otherwise (in the absence of a control indicium) it would have appeared as shown in Fig. 25. The adapter relays 158 are released at the conclusion of the printing cycle when the sequence relay 161, Fig. 19 is released to break the anode circuit of the gas tube 162, thereby extinguishing this tube and releasing the relay 164.

Figs. 15A and 15B schematically represent the type faces formed by certain ones of the printing heads 3 to print different lines of information upon the instrument shown in Figs. 2 and 3. Fig. 15A depicts some of the type character formations which are effective to print numerals contained in the second line of billing data B, Fig. 2 (the printing heads 3 being viewed from the printing surface). In Fig. 15B the same printing heads 3 now are set to print the second line of the address A (Fig. 3) together with the billing amount B' (Fig. 2) on the same line. In this case the legible impressions of the amount and of the second address lines are to appear respectively on opposite sides of the sheet. Hence, in Fig. 15B, certain type character formations appear in obverse order while others appear in reverse order. Reference can be had to Fig. 5 for identifying certain ones of the printing heads 3 shown in Figs. 15A and 15B with the corresponding columns on the instrument which is being printed.

The formation of type faces alternatively in obverse and reverse orders, as just described, is related to a more fundamental conception which is set forth in the above stated objects of the invention, namely, to record characters selectively in a plurality of different systems by selectively utilizing a plurality of decoding schemes. An embodiment of this general idea is partially illustrated in Fig. 27, which shows a normal decoding chassis 152A of the sort illustrated in Figs. 21 and 22, and a special decoding chassis 152B having any optionally arranged network of circuits for producing distinctive characters or character representations in response to the same input data. The selectors such as 148A in the control unit 136A are employed in this instance to route impulses from the card sensing brushes selectively to either the normal decoding chassis 152A or the special decoding chassis 152B, depending upon the state of energization of these selectors. Thus, any given character representation sensed in the card can cause the mosaic of wires in the printing head 3 to form either of two different type faces for printing respectively a normal character or a special character. The special characters made available by the decoding chassis 152B can be, for example, symbols used in accounting or other technical symbols of a sort which ordinarily would not be available in a selective high-speed printer.

Simply by providing a special decoding chassis, therefore, it is possible to utilize the same group of printing wires for printing a whole new system of special characters in addition to the normal system of characters. In fact, there is no limit to the range of characters that can be made available (other than the requirement that all characters be accommodated by a given mosaic of printing elements), provided the necessary decoding schemes are incorporated in the machine. It should be noted further that this broad aspect of the invention is not limited to printing but can be applied to other forms of recording, such as punching, for example.

Sometimes it is desirable to make a reverse imprint on a sheet for transfer posting purposes. Fig. 28 illustrates an instrument on which the address A' has been printed in reverse order with a hectograph type of ink, thereby enabling the same to be utilized in a spirit duplicator or the like for reproducing the address in normal fashion on another sheet or body. The reverse imprint A' can, if desired, be made on the front of the instrument simultaneously with the appearance of the same address in normal reading fashion on the back of the sheet. The machine disclosed herein is adapted to make the desired reverse imprint, with or without the accompanying normal imprint on the other side of the sheet, simply by utilizing a sheet or instrument which does not have a masking section 7 as shown in Fig. 2. The imprint on the back of the sheet, if desired, can be obtained by utilizing an inking medium in the back of the sheet, as already disclosed herein. In some types of work it may be found feasible to employ a heated platen which will cause the ink deposited on the front of the sheet to penetrate the intervening material and cause to appear on the back of the sheet a mirror copy of the matter printed on the front.

Summarizing the advantages of the invention, it is apparent from the foregoing description that we have provided a novel method of high-speed, selective recording which greatly expands the range of character selection available heretofore and which, for the first time, makes it feasible to print data selectively upon two sides of a sheet in one operation, using type members which are disposed on one side of the sheet only. These type members, being of the convertible variety, can form type faces in a number of different character systems, whereby a choice is had between, for example, obverse and reverse formations of the same characters, or between Arabic characters and other characters or symbols, merely by decoding the input data in different ways before actuating these type members. Thus, in accordance with our invention, one can cause certain printing heads to print upon one side of the sheet at the same time that other printing heads in the same line are printing upon the reverse side of the sheet (Fig. 15B), or one can cause the same set of printing heads to print in one line upon one side of the sheet and in another line upon the reverse side of the sheet (Figs. 15A and 15B). One can also make whole new systems of characters available, where before there existed only one system or one-and-a-fraction systems of characters, thereby affording a total character capacity which far exceeds that of any prior selective recording machine. Still other advantages, not specifically mentioned herein, will be apparent to those skilled in the art from a study of the description and drawings.

While there have been shown and described and pointed out the fundamental novel features of the invention as applied to several preferred embodiments thereof, it will be understood that various omissions and substitutions and changes in the form and details of the devices illustrated and in their operations may be made by those skilled in the art, without departing from the spirit of the invention. It is the intention, therefore, to be limited only as indicated by the scope of the claims appended hereto.

The invention is claimed as follows:

1. In a convertible-type printing machine which is adapted to print selectively upon both sides of a sheet, a plurality of printing elements adapted to be actuated selectively in various combinations to form type faces of different characters, means for actuating said printing elements selectively to form a type face of a given character, means for imprinting the character from said type face upon one side of the sheet, means for actuating said printing elements selectively to form a type face which is the reverse of the first-mentioned type face, and means for making an imprint of the character from the last-mentioned face upon the other side of a sheet.

2. In a convertible-type printing machine which is adapted to print selectively upon both sides of a sheet, a plurality of printing elements adapted to be actuated selectively in various combinations to form type for printing various characters, means for actuating said printing elements selectively to form the type face of any given character in an obverse fashion, means for actuating said printing elements selectively to form the type face of any given character in a reverse fashion, first imprinting means for enabling an imprint to be made from the obverse type character formation upon one side of the sheet, and second imprinting means for enabling an imprint to be made from the reverse type character formation upon the opposite side of the sheet.

3. A convertible-type printing machine for printing selectively upon two sides of a sheet, said machine comprising a plurality of printing elements positioned in front of said sheet and adapted to be actuated selectively in various combinations to form type for printing various characters, a platen positioned in back of said sheet and cooperable with said printing elements, means for actuating said printing elements selectively to form obverse and reverse type for printing the selected characters, first inking means disposed between said printing elements and the sheet for enabling imprints of the obverse type of character formations to be made directly upon the front of said sheet, and second inking means disposed between said platen and the sheet for enabling imprints of the reverse type character formations to be made indirectly upon the back of said sheet.

4. In combination with the structure set forth in claim 3, an interposer between said second inking means and said sheet selectively operable to prevent obverse type character-formations from making imprints upon the back of said sheet.

5. The printing machine defined by claim 3, wherein said second inking means comprises a transfer medium restricted to the area on the back of said sheet which is to receive imprints of said reverse type character formations.

6. In a machine for recording characters selectively under the control of coded character representations in a source record, character-forming recording elements selectively operable in various combinations to record different characters, first sensing means for sensing the coded character representations in the source record, a first decoding scheme operable under the control of said first sensing means for producing character patterns conforming to a given character system in response to the sensed character representations, a second decoding scheme also operable under the control of said first sensing means for producing character patterns conforming to a different character system in response to the sensed character representations, a second sensing means for sensing a predetermined control indicium in the source record, and control means responsive to said second sensing means for rendering a selected one of said decoding schemes effective to control said recording elements, whereby said recording elements are operated under the control of the source record to record characters according to a system selected by the source record.

7. In a machine for recording characters selectively under the control of coded character representations respectively contained in a plurality of columns of a source record, means for sensing the character representations in all of said columns concurrently, first decoding means for decoding the sensed character representations according to one system, second decoding means for decoding the sensed character representations according to another system, means controlled by the source record for selecting one of said decoding means to be effective for all of said columns, and selective recording means operable under the control of the effective decoding means to record the decoded characters according to the selected system.

8. A convertible-type printing machine for printing characters selectively in response to coded character representations in a source record, said machine comprising a plurality of printing elements adapted to be actuated selectively in various combinations to form type faces for printing various characters, first sensing means for sensing the coded character representations in the source record, a first decoding scheme operable under the control of said first sensing means for producing character patterns conforming to a given character system in response to the sensed character representations, a second decoding scheme also operable under the control of said first sensing means for producing character patterns conforming to a different character system in response to the sensed character representations, a second sensing means for sensing a predetermined control indicium in the source record, and control means responsive to said second sensing means for rendering a selected one of said decoding schemes effective to control said printing elements, whereby said printing elements are operated under the control of the source record to print characters according to a system selected by the source record.

9. A printing machine as defined by claim 8, wherein said decoding schemes are so arranged that they will produce character patterns which are the reverse of each other in response to the same character representation.

10. A convertible-type printing machine for printing selectively upon two sides of a sheet, said machine comprising a plurality of printing heads positioned on one side of said sheet and each containing a plurality of printing elements adapted to be actuated selectively in various combinations to form type faces for printing various characters, said printing heads being arranged in two groups, means for selectively actuating the printing elements in one group of said printing heads to form obverse type faces for printing characters upon one side of the sheet, and other means for selectively actuating the printing elements in the other group of said printing heads to form reverse type faces for printing characters upon the other side of the sheet.

11. A convertible-type printing machine for printing selectively upon two sides of a sheet, said machine comprising a plurality of aligned printing heads positioned on one side of said sheet, each of said printing heads containing a plurality of printing elements adapted to be actuated selectively in various combinations to form type faces for printing various characters, means operable at one time for selectively actuating the printing elements in said printing heads to form obverse type faces for printing a line of characters upon the front of said sheet, and means operable at a different time for selectively actuating the printing elements in said printing heads to form reverse type faces for printing a line of characters upon the back of said sheet.

12. A printing machine as defined by claim 11, further comprising a selective inking means for enabling said printing heads to make impressions only in selected areas on said sheet.

13. A printing machine as defined by claim 12, wherein said selective inking means includes an inking medium in back of said sheet, and an interposer which is insertable between said medium and the sheet to suppress printing in selected areas on the back of said sheet.

14. A printing machine as defined by claim 12, wherein said selective inking means includes a transfer sheet in back of said first-mentioned sheet, said transfer sheet having carbon thereon only in the area where it is desired to make an impression upon the back of said first sheet.

15. In a convertible-type printing machine which is controlled by a source record bearing columns of coded character representations, the combination of sensing devices for individually sensing the character representations in said record columns, a first group of similar decoding schemes one for each of said columns, a second group of similar decoding schemes one for each of said columns, each of said decoding schemes being adapted respectively to convert any given character representation into character patterns in two different systems, selector means for selectively rendering one or the other of said groups of decoding schemes operative in response to said sensing devices, a plurality of printing heads each containing a plurality of printing elements operable in various patterns to form different type faces from which imprints are to be made upon a sheet, and means for selectively operating the printing elements in each printing head under the control of an individual decoding scheme in the group selected by said selector means.

16. A convertible-type printing machine as set forth in claim 15, further comprising a special sensing device for sensing a control indicium in the source record, said selector means being controlled by said special sensing device.

17. In a convertible-type printing machine which is adapted to print characters selectively upon a sheet under the control of a source record bearing columns of coded character representations, the combination of sensing devices for individually sensing the character representations in said record columns, a first group of similar decoding schemes one for each of said columns, a second group of similar decoding schemes one for each of said columns, said first and second decoding schemes being adapted respectively to convert any given character representation into obverse and reverse character patterns, selector means alternatively operable to place said sensing devices in different controlling relationships to said first and second groups of decoding schemes, control means for selectively rendering one or the other of said groups of decoding schemes operative in response to said sensing devices, a plurality of printing heads each containing a plurality of printing elements operable in various patterns to form different type faces from which imprints are to be made upon said sheet, and means for selectively operating the printing elements in each printing head under the control of an individual decoding scheme in the group selected by said control means to make a character imprint upon the obverse or reverse side of said sheet depending upon whether the type face is formed in accordance with an obverse or reverse character pattern.

18. In a convertible-type printing machine as set forth in claim 17, a special sensing device for sensing a control indicium in the source record, said selector means and said control means being under the control of said special sensing device.

19. In a convertible-type printing machine which is adapted to print characters selectively upon two sides of a sheet under the control of a source record bearing columns of coded character representations, the combination of sensing devices for individually sensing the character representations in said record columns, a first group of similar decoding schemes one for each of said columns, a second group of similar decoding schemes one for each of said columns, said first and second decoding schemes being adapted respectively to convert any given character representation into obverse and reverse character patterns, selector means alternatively operable to place said sensing device in different controlling relationships to said first and second groups of decoding schemes thereby to effect an inversion of columns, control means for selectively rendering one or the other of said groups of decoding schemes operative in response to said sensing devices, a plurality of printing heads positioned on one side of said sheet, each of said heads containing a plurality of printing elements operable in various patterns to form type faces for printing various characters, a platen cooperable with said printing heads for making character imprints therefrom upon said sheet, means for selectively operating the printing elements in each printing head under the control of an individual decoding scheme in the group selected by said control means, first inking means disposed between said printing heads and the sheet for enabling character imprints to be made upon the front of said sheet by obverse type character formations, and second inking means between said sheet and said platen for enabling character imprints to be made upon the back of said sheet from reverse type character formations.

20. The method of recording characters selectively upon two sides of a record medium under the control of coded character representations, said method comprising the steps of decoding certain character representations selectively in accordance with obverse patterns of the characters to be recorded, decoding other character representations selectively in accordance with reverse patterns of the characters to be recorded, forming obverse and reverse type faces respectively corresponding to the obverse and reverse character patterns, and recording characters from said obverse and reverse type faces respectively upon the two sides of the record medium.

21. The method of recording characters selectively upon two sides of a record medium from character-forming printing elements located on only one side of the medium, under the control of coded character representations, said method comprising the steps of decoding certain character representations in accordance with obverse patterns of the characters to be recorded, forming obverse type faces from said printing elements corresponding respectively to the obverse character patterns, printing characters from the obverse type faces upon one side of the record medium, decoding other character representations in accordance with reverse patterns of the characters to be recorded, forming reverse type faces from said printing elements corresponding respectively to the reverse character patterns, and printing characters from the reverse type faces upon the other side of the record medium.

References Cited in the file of this patent

UNITED STATES PATENTS

| | | |
|---|---|---|
| 2,118,888 | Lewis | May 31, 1932 |
| 2,163,958 | Neidich | June 27, 1939 |
| 2,209,586 | Swift | July 30, 1940 |
| 2,386,872 | Lewis | Oct. 16, 1945 |
| 2,398,982 | Watkins | Apr. 23, 1946 |
| 2,501,495 | Carroll | Mar. 21, 1950 |
| 2,524,127 | Johnson | Oct. 3, 1950 |
| 2,632,386 | Hyland | Mar. 24, 1953 |
| 2,653,534 | Wockenfuss | Sept. 29, 1953 |